DELTA MODULATION SIGNAL TRANSMISSION SYSTEM

Filed June 6, 1962 4 Sheets-Sheet 1

INVENTOR
*JOHANNES A. GREEFKES*

BY Frank R. Jifari
AGENT

May 3, 1966 J. A. GREEFKES 3,249,870

DELTA MODULATION SIGNAL TRANSMISSION SYSTEM

Filed June 6, 1962 4 Sheets-Sheet 2

INVENTOR
JOHANNES A. GREEFKES

BY Frank R. Trifari
AGENT

INVENTOR.
JOHANNES A. GREEFKES
BY
Frank R. Jifani
AGENT

DELTA MODULATION SIGNAL TRANSMISSION SYSTEM

Filed June 6, 1962 4 Sheets-Sheet 4

INVENTOR.
JOHANNES A. GREEFKES
BY
Frank R. Jufari
AGENT

United States Patent Office 3,249,870
Patented May 3, 1966

3,249,870

DELTA MODULATION SIGNAL TRANSMISSION SYSTEM

Johannes Anton Greefkes, Emmasingel, Eindhoven, Netherlands, assignor to North American Philips Company, Inc., New York, N.Y., a corporation of Delaware Filed June 6, 1962, Ser. No. 200,563
Claims priority, application Netherlands, July 20, 1961, 267,338
11 Claims. (Cl. 325—38)

Figures 1A, 1B:
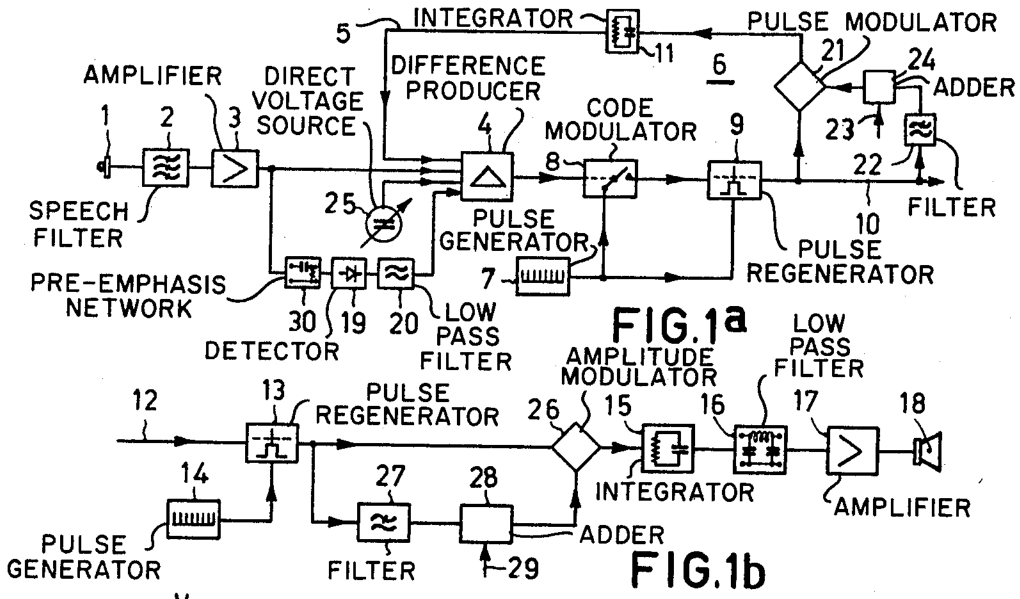

The invention relates to a transmission system for signal transmission by means of pulse code modulation and to transmitters and receivers suitable for use in this system. The transmitter comprises a code modulator connected to a pulse generator. The output pulses of the generator are transmitted to the associated receiver and are also applied to a comparison circuit comprising a local receiver for producing a comparison voltage, which, together with the signal to be transmitted, controls a difference producer in order to obtain a difference voltage, which controls the transmission of the pulses from the pulse generator in the code modulator.

The aforesaid modulation method is known as delta modulation and is described, for example, in Belgian patent specification No. 489,207.

With pulse code modulation, in general, and hence also with delta modulation the amplitude quantisation gives rise to deviations of the signal voltage reproduced at the receiver end from the initial signal voltage. These deviations produce the so-called quantisation noise. This quantization noise has a particularly disturbing effect at comparatively low signal voltages, or signal levels, and in addition, due to the amplitude quantization, the transmission of these low signal voltages is inaccurate.

In a delta modulation system the accuracy in reproduction increases with increases in pulse frequency and the power of the quantization noise in the range of the signal frequencies decreases, i.e. by the third power, as has been found, of the maximum pulse frequency, so the third power, as has been found, of the maximum pulse frequency, so that for a high quality transmission very high pulse frequencies and hence a large bandwith are required. In order to fulfill the recommendations of the Commission, Consultative Internationale de Télégraphie et de Téléphonie, for normal telephone communications with respect to the transmission quality of a speech signal, for example, a maximum pulse frequency of more than 100 kc./s. is required.

The invention has for its object to provide a transmission system and transmitters and receivers suitable for use in this system of the kind referred to above, in which not only a surprisingly simple construction but also a considerably more accurate reproduction of the signals to be transmitted and an appreciable reduction of the quantization noise are achieved.

According to the invention the transmitting device comprises a level voltage generator fed by the information to be transmitted. The output voltage of the level voltage generator is fed as a control-voltage to the code modulator. In the local receiver and in the associated receiver, the code pulses emitted by the code modulator are fed to a pulse modulator, in which the energy contents of the code pulses supplied there to are modulated by a smoothed direct-voltage component. This component is derived from a smoothing filter fed by the code pulses to be transmitted When carrying out the measures according to the invention a transmission quality is obtained that with an extremely low pulse frequency, for example even of 40 kc./s. which fulfils the Commission Consultative Internationale de Télégraphie et de Téléphonie recommendations for normal telephone communication.

The pulse modulator is preferably formed, for the modulation of energy contents of the code pulses fed thereto, by a pulse amplitude modulator, but it is also possible to use to this end a pulse duration modulator.

The invention and its advantages will now be described with reference to the figures.

FIGS. 1*a* and 1*b* are block diagrams of a transmitter and of a receiver respectively for a delta modulation system according to the invention.

Figure 2:
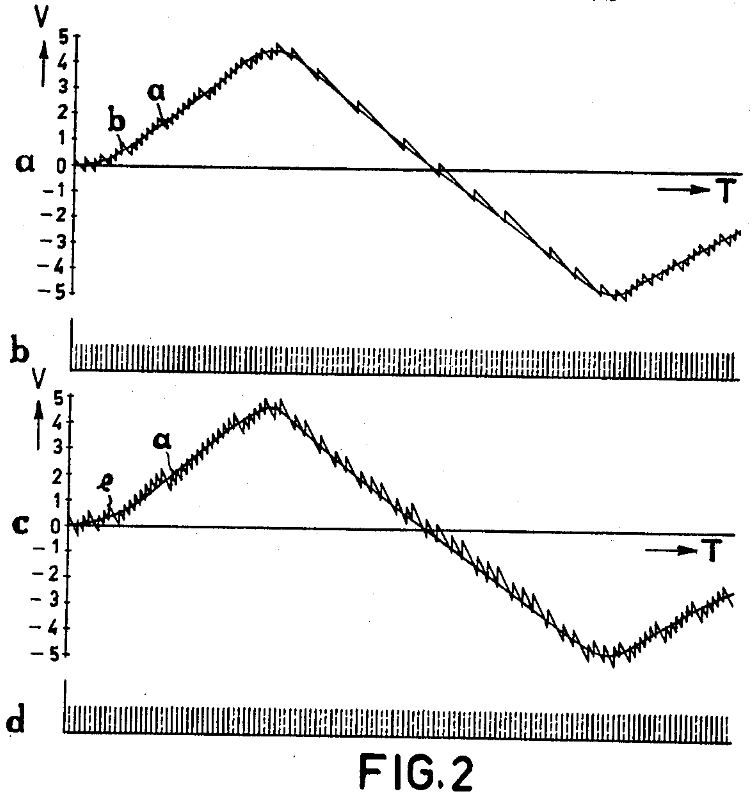
Figure 3:
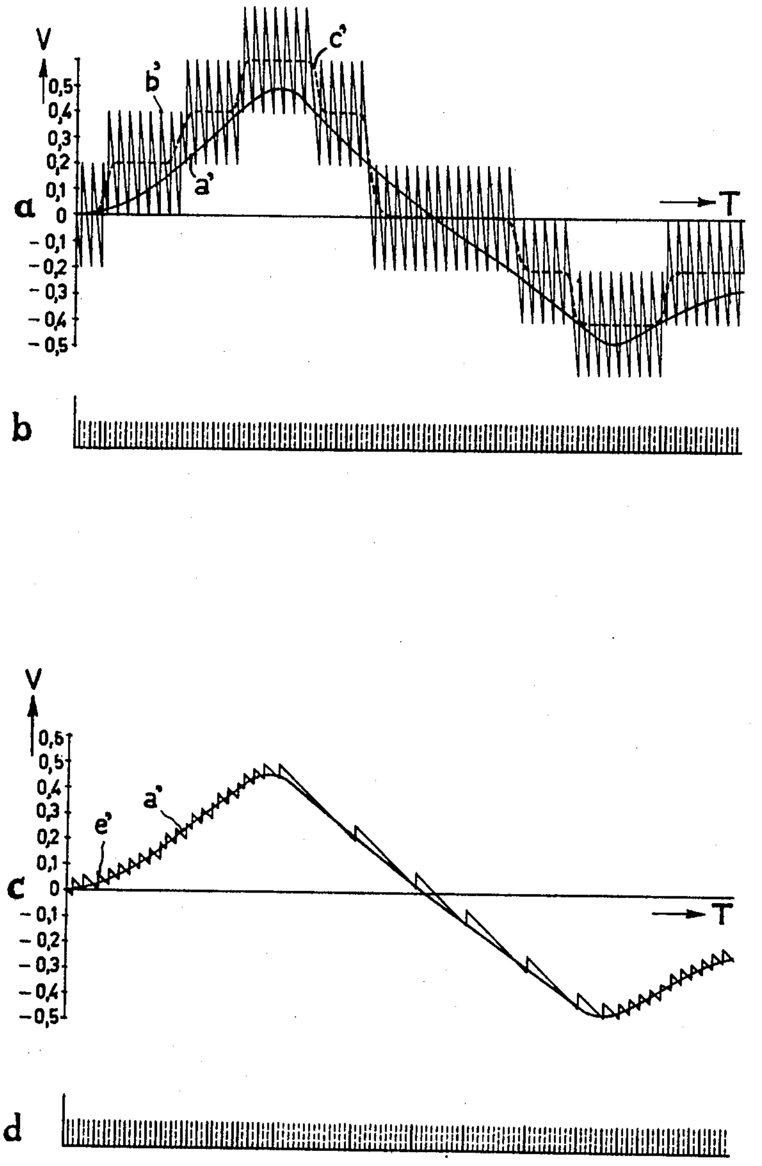

FIGS. 2 and 3 show a few time diagrams for explaining the operation of the devices shown in FIGS. 1*a* and 1*b*.

Figure 4:
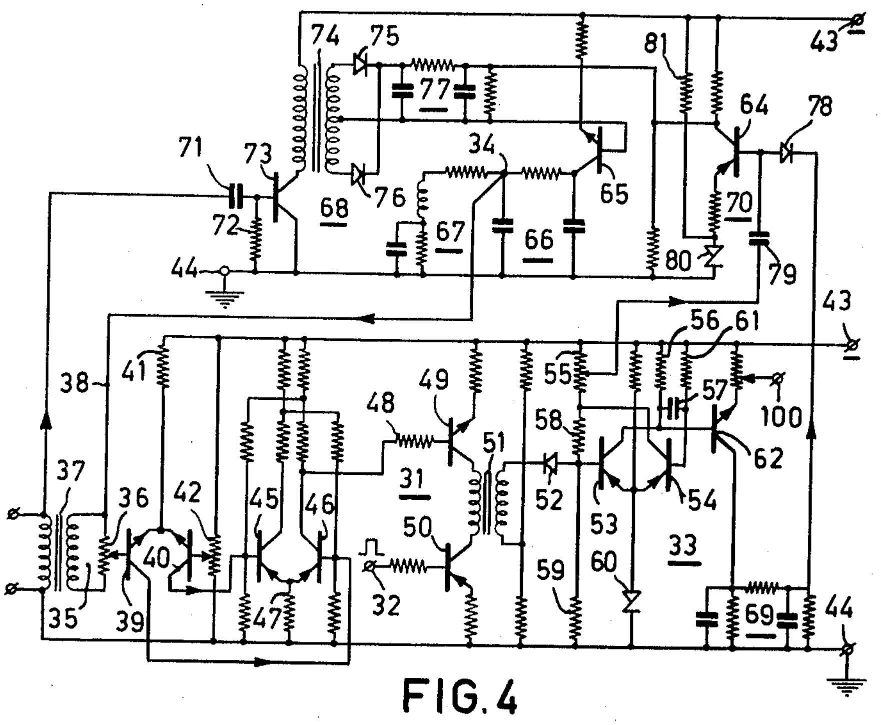
Figure 5:
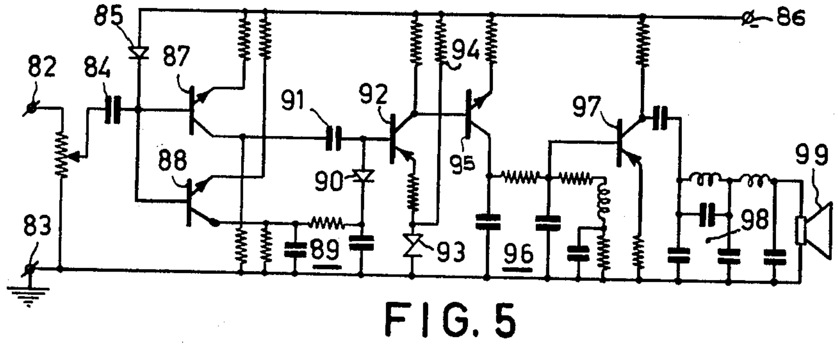

FIGS. 4 and 5 shown in detail a transistor circuit for a transmitter and a receiver respectively for delta modulation according to the invention.

Figure 6:
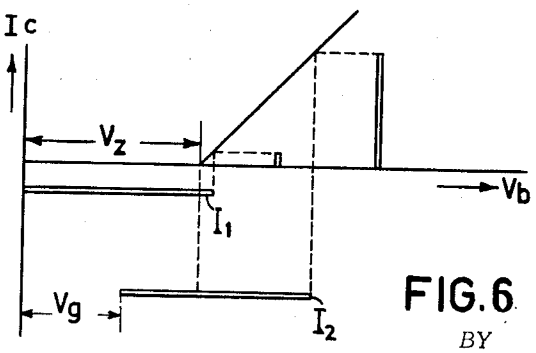
Figure 7:
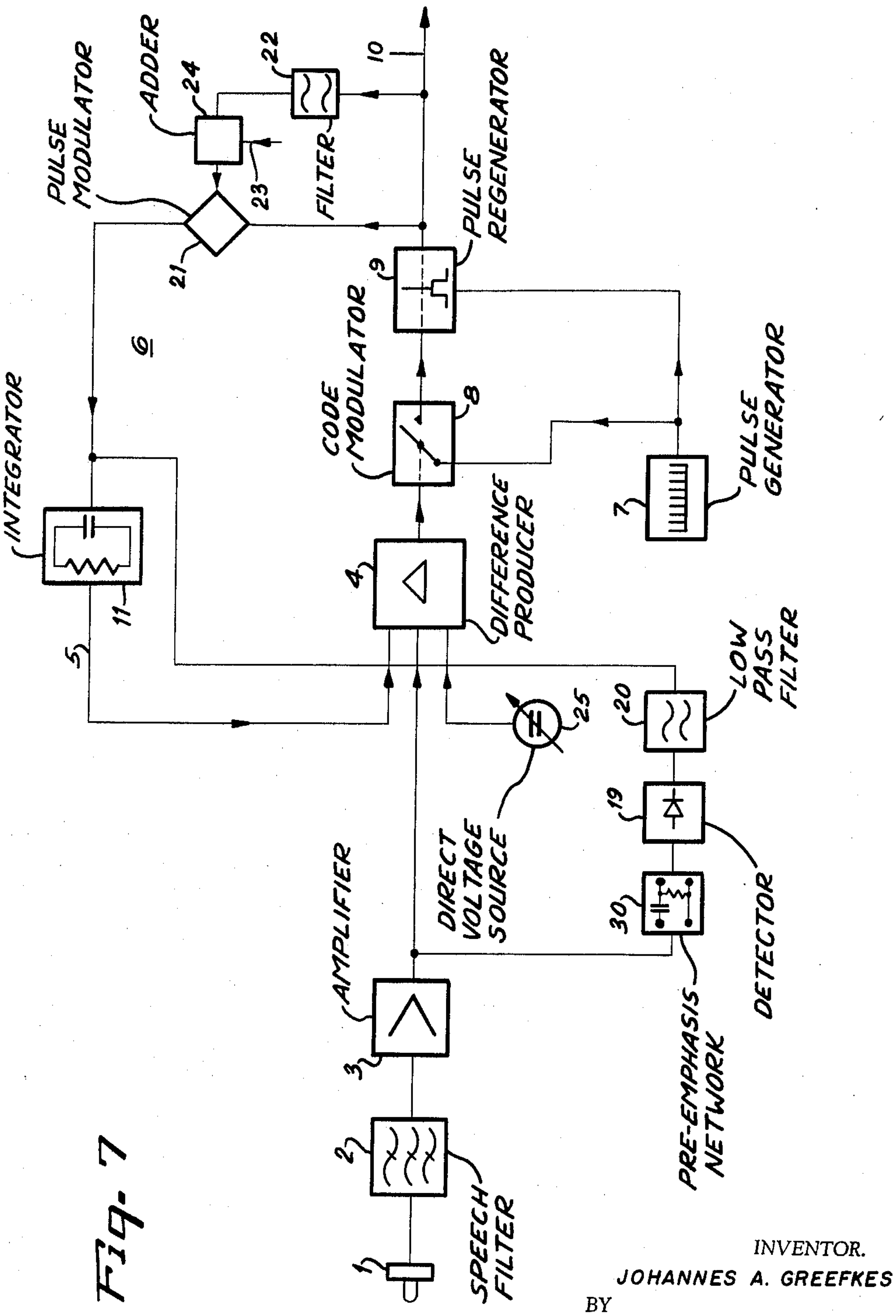

FIG. 6 shows a current-voltage diagram for explaining the transmitting device shown in FIG. 4; and FIG. 7 is a block diagram of a modification of the transmitter of FIG. 1(*a*).

With the delta modulation transmitter shown in the block diagram of FIG. 1*a*, the speech signals derived from a microphone 1 are supplied via a speech filter 2 having a pass band between 300 c./s. and 3400 c./s. and a low-frequency amplifier 3 to a difference producer 4.

To the difference producer 4 is, in addition, fed via a conductor 5, a comparison signal, obtained in a manner to be described hereinafter from a local receiver 6, in order to obtain a difference signal which controls a code modulator 8, connected to a pulse generator 7. The pulse generator 7 supplies equidistant pulses with a repetition frequency which is a factor higher than the maximum frequency of the speech signal to be transmitted.

In accordance with the polarity of the output voltage of the difference producer 4 pulses from the pulse generator 7 occur at the ouput of the code modulator 8, or they are suppressed, and the sequence of code pulses thus obtained is fed to a pulse regenerator 9, in order to suppress variations in the amplitude, duration, waveform or instant of occurrence of the pulses in the code modulator 8. This regeneration is carried out by the replacement of the supplied pulses by pulses derived directly from the pulse generator 7. The regenerated pulses are transmitted via a conductor 10, if desired subsequent to modulation on a carrier-wave frequency, to the associated receiver, which is shown in FIG. 1*b*. The regenerated pulses are also applied to the local receiver 6 included in a comparison circuit which is provided with a signal-frequency integrating network 11. The time constant of the signal-frequency integrating network may be 0.01 sec. At the output of the local receiver 6 is produced the aforesaid comparison voltage which is fed via the conductor 5 to the difference producer 4.

The circuit described above tends to reduce the difference voltage to zero, so that the comparison signal derived from the local receiver 6 in the comparison circuit becomes a quantized approximation of the input signal.

In other words, viewed in the time diagram, the comparison signal fluctuates around the input signal, the rhythm of the fluctuation being determined by the pulse repetition frequency. It should be noted that with delta modulation the code pulses do not constantly characterize the instantaneous value of the signal to be transmitted, but the difference between this instaneous value of the signal from the preceding instantaneous value derived from the comparison signal. The pulse pattern of the code pulses thus characterizes the flank of the signal.

FIG. 1*b* shows a receiver suitable for use with the transmitter of FIG. 1*a*. The pulses obtained from the conductor 12, which may be deformed, are replaced by means of the pulse regenerator 13, connected to a local pulse generator 14, to be synchronized to the pulse generator of the transmitter, by locally produced pulses. These regenerated pulses are fed to a signal-frequency integrating network 15, corresponding with the integrating network of the local receiver included in the comparison circuit of the transmitter, so that at the output of the integrating network 15 a signal corresponding with the comparison signal of the transmitter is obtained. Via a low bandpass filter 16, which passes the desired speech frequency band and suppresses frequencies exceeding this value, the signal is fed to a low-frequency amplifier 17, which is connected to a reproducing device 18.

In order to explain the operation of the transmission system so far described, FIG. 2 shows a few time diagrams. FIG. 2*a* shows a curve *a*, which represents the voltage waveform of a speech signal to be transmitted. The sawtooth curve *b*, swinging around the curve *a*, illustrates the comparison voltage at the output of the integrating network 11.

Whenever the comparison voltage *b* at the instant of a pulse from the pulse generator 7 is lower than the signal *a* to be transmitted, i.e. when a positive difference voltage occurs, the code modulator 8 transmits a pulse. This pulse is transmitted, subsequent to pulse regeneration, via the conductor 10 to the associated receiver and it is also applied to the input of the local receiver 6, so that the voltage at the output of the integrating network 11 increases by a fixed amount. In the next-following period of time the voltage of the integrating net-work 11 decreases in a sawtooth-like manner. In accordance with the condition at the occurrence of a next-following pulse from the pulse generator 7 whether the difference voltage is either positive or negative, this pulse is passed by the code modulator 8 or suppressed. Thus the integrating network 11 produces a voltage *b*, which has a sawtooth variation that swings around the speech voltage to be transmitted and thus forms an approximation of the speech voltage.

FIG. 2*b* illustrates the pulses required for producing the approximation curve and the comparison voltage *b* by full lines, whereas the pulses from the pulse generator 7, which are suppressed by the code modulator 8 owing to the absence of a positive difference voltage, are indicated in FIG. 2*b* by broken lines.

In order to illustrate the operation of the system described above in the case of a low signal voltage and hence of a low signal level, FIG. 3 shows time diagrams corresponding with those of FIG. 2. FIG. 3*a* shows by the curve *a'* the speech signal to be transmitted, differing only in the amplitude from the speech voltage illustrated in FIG. 2*a*. The amplitude of the speech voltage *a'* is materially smaller, for example a factor of 10 smaller than that of the speech voltage a of FIG. 2*a*. In this figure the speech voltage *a'* is indicated in a 0.1 volt scale, which means that the speech voltage is indicated on a scale that is ten times larger than the signal voltage *a* of FIG. 2*a*, as well as the comparison voltage *b'*, obtained by the integration of the pulse sequence. FIG. 3*b* shows the transmitted pulse sequence.

As a result of the amplitude quantization, the accuracy of approximation of the speech voltage *a'* decreases with low amplitude owing to its comparison voltage *b'*; details of the speech voltage, or the speech voltage itself, in particular, is no longer transmitted below a given threshold value; the curve *c'*, given in FIG. 3*a* in broken lines, illustrates the low-frequency component of the integrated pulse sequence, which constitutes, as will be seen from the figure, a very coarse approximation of the speech signal *a'*. Moreover, with the speech voltages of low amplitude the quantisation noise is particularly disturbing since in its absolute value the quantisation noise is constant and independently of the speech voltage, which means that the ratio between the speech voltage and the quantisation noise decreases towards the low amplitude speech voltages.

The two effects, which are particularly disturbing with low speech amplitude, i.e. on the one hand the inaccuracy of the reproduction and on the other hand the ratio between the speech voltage and the quantisation noise decreasing with a lower speech amplitude, are reduced efficaciously by the invention by providing the system, in addition, with a level voltage generator fed by the speech signals to be transmitted and formed by a detector 19 and a low bandpass filter 20, connected thereto and having a limit frequency of, for example, 50 c./s., the output voltage of which is fed as a control-voltage via the difference producer 4 to the code modulator 8. In the local receiver 6 the code pulses transmitted by the code modulator 8 via the pulse generator 9 are fed to a pulse modulator 21, in which the energy content of the code pulses fed thereto are modulated by a smoothed direct-voltage component obtained from a smoothing filter 22, fed by the transmitted code pulses. In the system shown the pulse modulator 21 comprises a pulse amplitude modulator, and the level voltage from the level voltage generator 19, 20 is fed to the difference producer 4.

If in the system described a direct voltage in the form of a level voltage is fed, instead of a speech signal, to the code modulator, the amplitude modulator 21 being provisionally left out of consideration, the circuit will tend to render the difference voltage equal to zero, as in the case of the speech signal. Therefore, this circuit tends to render the direct voltage derived from the local receiver 6, determined by the average direct-voltage component of the code pulses supplied thereto, equal to the direct voltage supplied. This means that with the supply of a direct voltage the code pulses passing the code modulator 8 and hence the pulse density adjusts itself automatically so that the difference direct voltage is practically equal to zero.

By smoothing the code pulses transmitted, the smoothing filter 22 provides an output having a direct voltage composed of a constant component determined by the pulse density in the absence of a level voltage and a direct voltage component varying with the level voltage. This direct voltage component amplitude modulates the code pulses fed to the integrating network 11 in the pulse amplitude modulator 21. The circuit described tends as before to render the comparison voltage obtained by smoothing the code pulses, the density and amplitude of which now vary, equal to the direct voltage supplied. In order to ensure that the output voltage of the smoothing filter 22 can follow the level variations, the cut-off frequency of the smoothing filter 22 is at least equal to the cut-off frequency of the output filter 20 of the level voltage generator 19, 20; the cut-off frequency of the smoothing filter 22 may, for example, be 100 c./s. and that of the output filter 20 of the level voltage generator 50 c./s. Thus, in the system described, a variation of direct voltage fed to the code modulator is compensated by a density variation together with an amplitude variation of the code pulses fed to the integrating network 11. For an opimum transmission quality it is found to be advantageous to cause a variation of the level voltage to be compensated for the major part by the amplitude variation of the code pulses fed to the integrating network 11, which means that the amplitude of these code pulses should be substantially proportional to the output voltage of the level voltage generator 19.

This is achieved in a simple manner by supplying, in addition, a constant reference voltage of suitable value as a modulation voltage to the pulse amplitude modulator 21 via a conductor 23. To this end the modulation voltage is joined first to the output voltage of the smoothing filter 22 in an adder 24 in the system described. The value of the reference voltage is chosen so that in the absence of a speech signal in the pulse amplitude modulator the amplitude of the code pulses is reduced for the major part, for example to 5%. With a variation of the level voltage the amplitude of the code pulses derived from the amplitude modulator 21 will vary substantially proportionally to the level voltage. At the same time a variation of the pulse density will occur. This density is adjusted, in the absence of a speech signal, by means of an adjusting voltage fed to the difference producer 4 and obtained from a direct-voltage source 25 so that the pulse density then occurring is about 0.3 times the density at the maximum pulse repetition frequency.

FIGS. 2*c* and 3*c* illustrate again, on scales differing by a factor of 10, the speech signals illustrated in FIGS. 2*a* and 3*a* and indicated by *a* and *a'*. FIG. 2*c* illustrates the signal voltage *a* in volts and FIG. 3*c* the signal voltage *a'* in tenths of volts. If in this system the level of the speech signal *a* of FIG. 2*a* is gradually reduced to the tenfold lower level of the speech signal *a'*, the average pulse density of the transmitted code pulses decreases owing to this reduction of the direct output voltage of the level voltage generator 19, 20, as stated above, so that the direct output voltage of the smoothing filter 22 will also decrease. This direct voltage variation causes the amplitude of the code pulses derived from the amplitude modulator 21 to decrease substantially proportionally to the level voltage. With the transmission of the speech signal *a'* of FIG. 3*c* particularly the amplitude of the code pulses fed to the integrating network 11 is lower by a factor of 10 than with the transmission of the speech signal *a* of FIG. 2*c*.

FIGS. 3*c* and 2*c* illustrate the comparison voltages obtained by the integration of these code pulses, the amplitude of which is lower by a factor of 10 for the speech signal *a'* than for the spech signal *a*, by the curves *e'* and *e* respectively. It will be seen from these curves that by carrying out the measures according to the invention, an appreciably more accurate approximation of the speech signal *a'* of low amplitude is obtained by the comparison voltage *e'* than with the known system (cf. curve *b'* in FIG. 3*a*). Particularly the accuracy of the approximation of the speech signals *a* and *a'* by means of the associated comparison voltages *e* and *e'*, owing to the adaptation of the amplitude of the code pulses fed to the integrating network to the level of the speech signal, is rendered to a great extent independent of the amplitude of the signal, which will be seen from FIGS. 2*c* and 3*c*.

FIGS. 2*d* and 3*d* illustrate the code pulses to be transmitted containing, in the system according to the invention, two types of information about the speech signal to be transmitted; the average pulse density indicates the level and the presence or absence of the code pulses indicates the course of the speech signal, so that it is possible to reproduce the transmitted signal with high accuracy.

In the associated receiver shown in FIG. 1*b* the two types of information about the transmitted pulse sequence are handled in the same manner as in the local receiver of the transmitter in order to regain the transmitted speech signal. The regenerated pulses derived from the pulse regenerator 13 are fed on the one hand to a pulse amplitude modulator 26 and on the other hand to a smoothing filter 27. The output voltage of the filter, subsequent to the addition to a constant reference voltage in an adder 28, which voltage is derived from a conductor 29, constitutes the modulation voltage at the pulse amplitude modulator 26. The amplitude-modulated output pulses of the pulse amplitude modulator are fed, subsequent to integration in the intergating network 15 and smoothing in the low bandpass filter 16, to the reproducing device 18 for reproduction via the low frequency amplifier 17. From FIGS. 2*c* and 3*c* it will be seen that the transmitted signals *a* and *a'* are reproduced with great accuracy, independently of their level.

The measures according to the invention provide not only a marked improvement in the accuracy of repreduction, but also an appreciable reduction of the disturbing quantization noise with the lower signal amplitudes. With a low signal level the amplitudes of the code pulses is reduced accordingly and hence the quantization noise is also reduced. With the transmission of the speech signal *a'* of FIG. 3*c*, for example the amplitude of the code pulses derived from the pulse amplitude modulator 26 is a factor 10 lower than that of the speech signal *a'* of FIG. 3*a*, which means that the amplitude of the quantization noise with the transmission of the speech signal *a'* is reduced by a factor 10, which means a reduction by a factor of 100 in power.

While all advantages of pulse code transmission are maintained, its disadvantages due to the amplitude quantization inherent in pulse code transmission, i.e. the disturbing quantisation noise with low amplitudes and the inaccuracy in reproduction are materially reduced. When carrying out the measures according to the invention, an appreciable improvement of more than 25 db of the transmission quality was realised, so that it was possible to fulfill the recommendations of the Commission Consultative International de Télégraphie et de Téléphonie with respect to quality for normal telephone communications with the very low maximum pulse repetition frequency of 40 kc./s. This is achieved with the known delta modulation devices only with a pulse repetition frequency of more than 120 kc./s. This marked improvement could be realized with particular simplicity, so that this technically and scientifically extremely refined system is particularly attractive for practical use.

Apart from the aforesaid marked improvement in the influence on quality with code modulation, optimum transmission features can be obtained with the system described above in a simple manner, independently of the speech frequency throughout the frequency range by supplying the speech signals to be transmitted by way of differentiating or pre-emphasis network 30 to the level voltage generator. This improvement may be accounted for by the fact that with delta modulation the emitted code pulses characterise the flank of the signal to be transmitted. With the system described an extraordinary improvement in quality of more than 30 db was measured.

It should be noted here that instead of connecting the level voltage generator 19, 20 to the difference producer 4, it may, as an alternative, be conencted at a different point of the circuit between the output of the amplitude modulator 21 and the input of the code modulator 8. This also applies to the adjusting voltage of the direct-voltage source 25. For practical reasons it appears to be advantageous in this case to connect the level voltage generator 19, 20 directly to the input of the integrating network 11, which is indicated in FIG. 7.

FIG. 4 shows a transmitter for delta modulation according to the invention employing transistor equipment.

The transmitter comprises a code modulator 31, to the input terminal 32 of which are fed equidistant pulses from a pulse generator. The transmitter also comprises more a pulse generator 33, a comparison circuit including an integratnig network 34 and a difference producer 35, which is provided in this embodiment with a resistor 36, to which the speech signals to be transmitted are fed via a transformer 37 and the comparison voltage via a conductor 38.

The difference voltage is added to a constant adjusting voltage in a transistor stage comprising two transistors 39, 40 having a common emitter resistor 41. The difference voltage is applied to the base electrode of the transistor 39. The adjusting voltage, which is derived from a potentiometer 42, connected between the terminals 43, 44 of a supply source, is applied to the base electrode of the transistor 40.

For controlling the code modulator 31, the collector electrodes are connected to the base electrodes of two transistors 45, 46, connected as non-linear amplifiers and forming a bistable trigger, the collector and base electrodes of which are crosswise connected to each other via resistors, whereas the emitter electrodes are connected to a common emitter resistor 47.

A push-pull output voltage is produced at the collector electrodes of the transistors 39, 40. In accordance with the polarity of the voltage difference between the collector voltages, the transistor 45 or the transistor 46 conveys current and the control-voltage for the code modulator 31 is taken from the collector electrode of the transistor 46 via a resistor 48.

The code modulator comprises two series-connected transistors 49, 50 with a primary winding of a transformer 51, connected between these transistors. Equidistant pulses of negative polarity derived from the pulse generator are fed to the base electrode of the transistor 50. These pulses, however, do not give rise to transmission via the transformer 51, unless the transistor 49 has released its base electrode by a positive control-voltage. However, as soon as a control-voltage, which is positive relative to the emitter electrode is fed to the base electrode of the transistor 49 by way of resistor 48, the pulses fed to the base electrode of the transistor 50 are applied in amplified form to the transformer 51 and are fed to the pulse regenerator 33 via a diode 52, connected as a threshold device.

The pulse regenerator 33 comprises two crosswise coupled transistors 53, 54, connected as monostable relaxation generator. The collector circuits of the transistors 53, 54 include collector resistors 55, 56. The base electrode of the transistor 54 is coupled via a capacitor 57 to the collector of the transistor 53. The base electrode of the transistor 53 is directly coupled with the aid of a potentiometer 57, 58, 59 to the collector of the transistor 54. The emitter electrodes of the two transistors 54, 53 are connected to a constant bias voltage from a Zener diode 60. The base electrode of the transistor is connected via a resistor 61, to the negative voltage terminal 43 of the supply source, so that it is ensured that in the rest position the transistor 54 is conducting and the transistor 53 is blocked.

The pulse regenerator operates in known manner, so that a further explanation may be dispensed with. Every time a pulse of negative polarity is fed to the base electrode of the transistor 53 via the transformer 51, the pulse regenerator changes over to its operational state, in which the transistor 53 is conducting and the transistor 54 is blocked. This state is maintained only for a period of time determined by the time constant of the circuit including the capacitor 57, the resistors 56 and 61, after which the circuit described changes back to the rest position. Regenerated pulses derived from the pulse regenerator 33 are fed on the one hand for further transmission, to a transistor 62 connected as an output amplifier having an output terminal 100 and on the other hand to the local receiver included in the comparison circuit. The pulses derived from the resistor 55 of the pulse regenerator are fed via a transistor 64, to be described hereinafter, to a transistor 65. The collector circuit of transistor 65 includes the integrating network 34 for producing the comparison voltage which is supplied via the conductor 38 to the difference producer 36. The network employed is of a type described in detail in British patent specification 691,824. It comprises the cascade connection of a first integrating network 66 having a time constant approximately equal to one period of the lowest speech frequency and a second integrating network 67, having a considerably lower time constant for integrating the pulse frequencies.

As stated above with reference to FIG. 1*a*, code-modulated pulses are derived from the circuit described above. The presence and absence of these pulses is determined by the polarity of the voltage difference between the speech signal and the comparison signal. The pulse density of the emitted code pulses can be adjusted by means of the adjusting voltage, which is fed via the potentiometer 42 to the base electrode of the transistor 40.

In order to improve the transmission quality the delta modulation transmitter also comprises a level voltage generator 68, which is connected via a differentiating network by the transmitted speech signals, and a smoothing filter 69 for smoothing the transmited code pulses, and a pulse amplitude modulator 70. These elements will now be described in detail.

In the system described so far the speech signals fed to the transformer 37 are supplied via a differentiating network formed by a capacitor 71 and a resistor 72 and having a time constant of, for example, $10^{-4}$ sec., to the level voltage generator 68.

The level voltage generator 68 is formed by a transistor amplifier 73, the collector circuit of which is coupled via a transformer 74 with a push-pull rectifier having two rectifying cells 75, 76 and an output filter 77. The output voltage of the filter is fed via the transistor 65 to the output circuit of the integrating network 34. The output filter 77 of the recifier, which filter comprises resistors and capacitors, may have a cut-off frequency of, for example, 50 c./s.

In order to obtain a direct voltage varying with the density of the transmitted code pulses, the collector circuit of the output amplifier 62 includes the smoothing filter 69 comprising resistors and capacitors and having, for example, a cut-off frequency of 100 c./s. In the system described the output voltage of the smoothing filter 69 has superimposed on it, with the aid of a diode 78, the pulses obtained from the pulse regenerator 33 and fed to the diode 78 via a capacitor 79. The pulse sequence superimposed on the output voltage of the smoothing filter 69 is supplied to a transistor 64, which is blocked by a reference voltage of the emitter circuit, so that in the absence of a level voltage only a small fraction of the pulses fed to the transsitor is allowed to pass. The reference voltage is obtained from a Zener diode 80, which is connected via a resistor 81 to the negative voltage terminal 43 of the supply source.

In order to explain the operation of the pulse amplitude modulator FIG. 6 illustrates the base voltage $V_b$—collector current $I_c$ characteristic curve of the transistor 64, in which $V_z$ designates the blocking voltage produced by the Zener diode 80. In the absence of a level voltage $V_g$ the code pulses fed to the transistor 64 are suppressed for the major part, for example to 5%, which is indicated by the pulse $I_1$, whereas in the presence of a level voltage $V_g$ the code pulses are superimposed on this level voltage (cf. pulse $I_2$), so that the passed part of the code pulse is increased by the level voltage $V_g$. Then a sequence of code pulses is produced at the collector electrode of the transistor 64. The amplitude of these pulses varies substantially proportionally to the amplitude of the level voltage, as described with reference to FIG. 1*a* and as is illustrated in FIG. 6. This sequence, when supplied to the integrating network 34, furnishes a comparison voltage, which constitutes an accurate approximation of the transmitted speech signal.

FIG. 5 shows the transistorized, associated transistor receiver.

In this embodiment the regenerated pulses fed to the input terminals 82, 83 are supplied to a direct-voltage restorer formed by a capacitor 84 and a diode 85, so that the feet of the regenerated code pulses are fixed on the voltage of the negative terminal 86 of the supply source.

The code pulses thus obtained are fed in parallel to two transistor amplifiers 87 and 88. The collector circuit of the transistor amplifier 88 including a smoothing filter 89, composed of resistors and capacitors in order to obtain a direct voltage varying with the pulse density. In the manner described with reference to FIG. 4 the output voltage of the smoothing filter 89 has superimposed on it, by means of a diode 90, the code pulses emanating from the transistor amplifier 87 via a capacitor 91 and supplied to a transistor 92, which is blocked by a reference voltage of the emitter circuit. As in the local receiver of the transmitter shown in FIG. 4, this reference voltage is derived from a Zener diode 93, which is connected via a reisstor 94 to the negative terminal 26 of a supply source Amplitude modulated code pulses occur in the collector circuit of the transistor 92, as is illustrated in FIG. 6. These pulses are fed by way of a transistor 95 to an integrating network 96, which is constructed similarly to the integrating network 34, of the local reciver at the transmitter.

The output voltage of the integrating network 96 is fed via a low bandpass filter 98 to a reproducing device 99 and as explained with reference to FIG. 1 and to FIGS. 2 and 3, an extraordinary improvement in transmission quality is realized, when the measures according to the invention are carried out.

In the embodiment of the system described above the realisation of an excellent reproduction quality does not require the use of any particular type of device for the amplitude modulator 21, 26 in the transmitter and the receiver, provided that care is taken that the characteristic curves of these pulse amplitude modulators 21, 26 are identical.

It should be noted here that instead of using the pulse amplitude modulators 21, 26 shown in FIGS. 1*a* and 1*b* in the system according to the invention use may be made of a pulse duration modulator, which may be of known structure. To this end the code pulses may be fed as excitation pulses to a monostable relaxation generator, the output voltage of the smoothing filter being fed as an adjusting voltage to the monostable relaxation generator. In these devices code pulses varying in duration with the level voltage are produced, which subsequent to integration in the integrating network, yield the same result as with the amplitude modulation of the code pulses in the embodiments described hereinbefore.

It should finally be noted that the measures according to the invention may be employed, not only with delta modulation systems in which the course of the transmitted signal is characterised by the presence and the absence of the code pulses, but also with delta modulation systems in which the transmitted signal is characterised by pulses of different polarities.

What is claimed is:

1. In a pulse code modulation system of the type comprising a source of periodic timing pulses, voltage responsive means connected to said source for providing a pulse sequence of pulses in synchronism with said timing pulses wherein the presence or absence of a pulse from said sequence is dependent upon the instantaneous voltage input to said voltage responsive means, integrating means connected to the output of said voltage responsive means, a source of signals, difference voltage producing means, means applying said signals and the output of said integrating means to said difference voltage producing means, means connecting the output of said difference voltage producing means to said voltage responsive means to provide said voltage input, and means for transmitting said pulse sequence, means for improving the low frequency signal transmission of said system comprising means connected to said signal source for providing a level control voltage, means applying said level control voltage to said voltage responsive means, means providing a direct voltage having a level dependent upon the average pulse density of said pulse sequence, and means for modulating the energy content of said pulse sequence applied to said integrating means with said direct voltage.

2. The modulation system of claim 1, in which said means for providing said level control voltage comprises a differentiating network connected to said source of signals, a detector connected to said differentiating network, a low-pass filter connected to said detector, and means for deriving said level control voltage from the output of said low-pass filter.

3. The modulation system of claim 1, in which said means for modulating said energy content comprises pulse amplitude modulating means.

4. The modulation system of claim 1, in which said means for modulating said energy content comprises pulse duration modulating means.

5. The modulation system of claim 1, in which said means applying said level control voltage to said voltage responsive means comprises means applying said level control voltage to the input of said integrating means.

6. In a pulse code modulation system of the type comprising a source of periodic timing pulses, voltage responsive means connected to said source for providing a pulse sequence of pulses in synchronism with said timing pulses wherein the presence or absence of a pulse from said sequence is dependent upon the instantaneous voltage input to said voltage responsive means, integrating means connected to the output of said voltage responsive means, a source of signals, difference voltage producing means, means applying said signals and the output of said integrating means to said difference voltage producing means, means connecting the output of said difference voltage producing means to said voltage responsive means to provide said voltage input, and means for transmitting said pulse sequence, means for improving the low frequency signal transmission of said system comprising detector means, means connecting said detector means to said signal source for providing a level control voltage, means applying said level control voltage to said voltage responsive means, means connected to the output of said voltage responsive means for providing a direct voltage having an amplitude that is a function of the average pulse density of said pulse sequence, means for modulating the energy content of said pulse sequence applied to said integrating means with said direct voltage, a direct voltage source, and means for connecting said direct voltage source to said voltage responsive means for controlling said pulse density in the absence of said signals.

7. The modulation system of claim 6, comprising a second direct voltage source, and means for adding said direct voltage to the output of said second direct voltage source for controlling the energy of said pulse sequence applied to said integrating means in the absence of said signals.

8. A delta modulating system comprising a source of signals, pulse code modulating means, integrating circuit means, receiver means, means applying the output of said pulse code modulating means to said integrating circuit means, means providing a direct voltage having a level dependent upon the average pulse density of the output of said pulse code modulating means, means for modulating the energy content of said output of said pulse code modulating means applied to said integrating circuit means with said direct voltage that is the difference between said signal voltage and the output of said integrating means, a source of periodic timing pulses, means applying said timing pulses and said difference voltage to said pulse code modulating means whereby said pulse code modulating means provides output pulses in synchronism with said timing pulses only when said difference voltage has a predetermined polarity, means connected to said source of signals for providing a level control voltage, means applying said level control voltage to said pulse code modulating means, and means transmitting said output pulses to said receiver.

9. The modulation system of claim 8, in which said receiver comprises means providing a second direct voltage having a level dependent upon the average pulse density of said output pulses, means for modulating the energy content of said output pulses with said second direct voltage, and output circuit means connected to said last-mentioned modulating means.

10. The modulation system of claim 9, in which said means providing said second direct voltage comprises low-pass filter means, adder means, a source of direct voltage, and means for connecting the output of said low-pass filter means and the output of said source of direct voltage to said adder means whereby the output of said last-mentioned modulating means is substantially suppressed in the absence of said signals.

11. A receiver for receiving delta pulse code modulation signals of the type in which the average density of transmitted pulses is proportional to the level of input signals and the presence or absence of code pulses is a function of the instantaneous course of said input signals, said receiver comprising means for receiving said pulse code modulation signals, low-pass filter means for providing a direct voltage that is a function of said average density, and means for modulating the energy content of said pulse code modulation signals with said direct voltage, means for integrating the output of said modulating means, and output circuit means connected to the output of said integrating means.

References Cited by the Examiner

UNITED STATES PATENTS

| | | | |
|---|---|---|---|
| 2,662,113 | 12/1953 | Schouten et al. | 325—38.1 |
| 2,816,267 | 12/1957 | De Jager et al. | 325—38.1 |

FOREIGN PATENTS

| | | |
|---|---|---|
| 684,318 | 12/1952 | Great Britain. |

DAVID G. REDINBAUGH, *Primary Examiner.*

J. W. CALDWELL, *Assistant Examiner.*